(No Model.)

J. PRINGLE.
HOSE COUPLING.

No. 408,434. Patented Aug. 6, 1889.

Witnesses,
Geo. H. Strong

Inventor,
James Pringle
By Dewey & Co.
Attys

N. PETERS, Photo-Lithographer, Washington, D. C.

UNITED STATES PATENT OFFICE.

JAMES PRINGLE, OF SILVER KING, ARIZONA TERRITORY, ASSIGNOR OF ONE-HALF TO ROBERT BOWEN, OF SAME PLACE.

HOSE-COUPLING.

SPECIFICATION forming part of Letters Patent No. 408,434, dated August 6, 1889.

Application filed March 6, 1889. Serial No. 302,148. (No model.)

*To all whom it may concern:*

Be it known that I, JAMES PRINGLE, of Silver King, in the county of Pinal and Territory of Arizona, have invented an Improvement in Hose-Couplings; and I hereby declare the following to be a full, clear, and exact description thereof.

My invention relates to the class of hose-couplings; and my invention consists in the construction and combination of devices which I shall hereinafter fully describe and claim.

Figure 1:
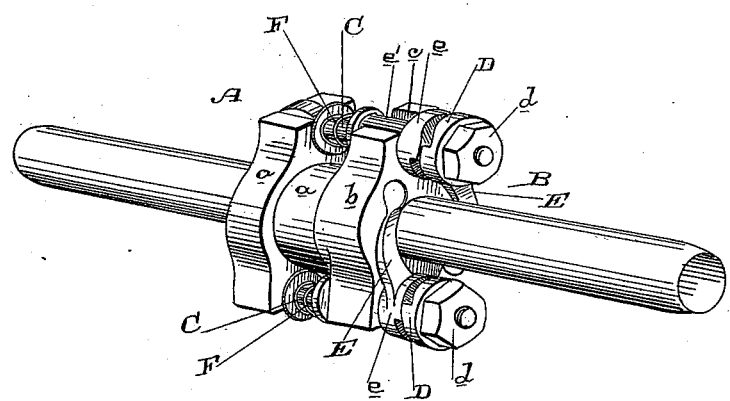
Figure 2:
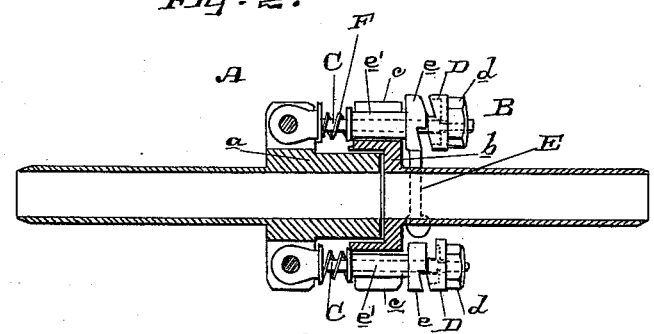
Figure 3:
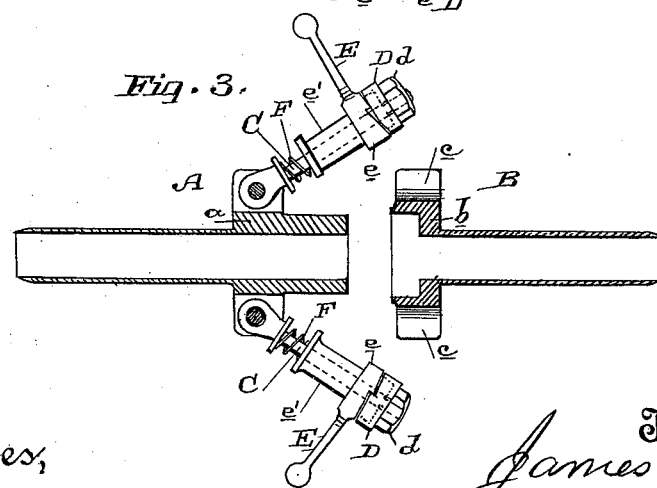

Referring to the accompanying drawings, Figure 1 is a perspective view of my coupling. Fig. 2 is a section of same. Fig. 3 is a view showing the parts separated and ready to be coupled.

A is one coupling, having head $a$, and B is the opposing coupling, having head $b$. One coupling fits into the other in ordinary manner. In the ends of the head $a$ are pivoted the swinging bolts C, and in the ends of head $b$ are made the grooves or bolt-seats $c$. Upon the end of each bolt is fitted a cam-faced disk D, which is set and held up to a shoulder on the bolt by a nut $d$.

E E are levers having cam-faced heads $e\ e$, fitted upon the ends of the bolts and bearing against the cam-faced disks D. The heads $e\ e$ are formed with sleeves $e'\ e'$, fitted upon the bolts, and springs F, encircling the bolts, bear against these sleeves and hold the cam-heads $e\ e$ up to the cam-disks.

The operation of the coupling is as follows: When the two couplings are brought together, the bolts C are thrown into their grooves or seats $c$, and the cam-levers are turned inwardly and in opposite directions, so that their cam-heads, bearing against the cam-disks and against the backs of the bolt-seats, tighten the bolts and force the couplings together and hold them. To relieve them, the levers are turned outwardly, so that their cam-heads move back and loosen the bolts, whereupon they can be thrown out of their seats $c$. The springs F, acting against the sleeves $e'$, keep the cam-heads well up to their places, so that when the bolts are thrown to their seats they will not interfere, but will fall snugly into place.

Gaskets or washers may be used if deemed desirable.

Having thus described my invention, what I claim as new, and desire to secure by Letters Patent, is—

In a hose-coupling, the opposing coupling-heads, one of which is provided with the grooves or bolt-seats $c$, in combination with the bolts C, pivoted in the opposing head, the cam-faced disks on the ends of the bolts, the levers having the cam-faced heads bearing against the disks, the sleeves of said heads, and the springs acting against the sleeves to hold the lever-heads to place, substantially as described.

In witness whereof I have hereunto set my hand.

JAMES PRINGLE.

Witnesses:
   JAMES B. MCNEIL,
   FRANK HUNT.